United States Patent
Du Plessis

(10) Patent No.: US 6,590,298 B1
(45) Date of Patent: Jul. 8, 2003

(54) ELECTRICAL POWER GENERATION UNIT FOR WELDING INCLUDING ELECTROMECHANICAL FEEDBACK MODE REGULATION

(76) Inventor: Deon John Du Plessis, 17 Yelanda Street, The Reeds, Centurion (ZA)

(*) Notice: Subject to any disclaimer, the term of this patent is extended or adjusted under 35 U.S.C. 154(b) by 0 days.

(21) Appl. No.: 09/490,382

(22) Filed: Jan. 24, 2000

Related U.S. Application Data

(63) Continuation-in-part of application No. PCT/ZW98/00010, filed on Jul. 17, 1998.

(30) Foreign Application Priority Data

Jul. 23, 1997 (ZA) .............................. 97/10629

(51) Int. Cl.[7] .................... H02K 7/02; H02P 15/00
(52) U.S. Cl. .................... 290/40 C; 290/4 R; 290/4 A; 290/40 R; 290/40 B
(58) Field of Search ................ 290/1 A, 40 R, 290/40 F, 40 B, 40 C, 4 H, 4 R; 322/1

(56) References Cited

U.S. PATENT DOCUMENTS

| | | | | |
|---|---|---|---|---|
| 2,671,860 A | * | 3/1954 | Bevins .................. 290/40 |
| 2,976,424 A | * | 3/1961 | Anderson ................ 290/1 |
| 3,895,212 A | | 7/1975 | Maxwell et al. .......... 219/135 |
| 4,015,189 A | * | 3/1977 | Gorden .................. 322/46 |
| 4,314,195 A | * | 2/1982 | Muter ................... 322/90 |
| 4,336,486 A | * | 6/1982 | Gorden et al. ........... 322/63 |
| 4,830,412 A | * | 5/1989 | Raad et al. ............. 290/31 |
| 4,908,565 A | * | 3/1990 | Cook et al. ............. 322/10 |
| 4,967,097 A | * | 10/1990 | Mehl ................... 307/84 |
| 5,013,929 A | * | 5/1991 | Dhyanchand ............. 290/31 |
| 5,444,214 A | | 8/1995 | Crouse et al. .......... 219/133 |
| 5,670,070 A | * | 9/1997 | Clark et al. ........... 219/130.33 |
| 5,708,254 A | * | 1/1998 | Ikegami et al. ......... 219/133 |
| 5,714,821 A | * | 2/1998 | Dittman ................ 310/179 |
| 5,734,147 A | * | 3/1998 | Bunker et al. .......... 219/130.33 |
| 5,968,385 A | * | 10/1999 | Beeson et al. .......... 219/130.33 |
| 6,005,220 A | * | 12/1999 | Bunker et al. .......... 219/130.33 |
| 6,040,556 A | * | 3/2000 | Shinya et al. .......... 219/133 |
| 6,067,945 A | * | 5/2000 | Fukuda et al. .......... 123/2 |
| 6,104,096 A | * | 8/2000 | Hicks .................. 290/1 R |
| 6,111,217 A | * | 8/2000 | Beeson et al. .......... 219/133 |
| 6,121,691 A | * | 9/2000 | Renner ................. 290/40 A |
| 6,274,944 B1 | * | 8/2001 | Letang ................. 290/40 R |
| 6,291,903 B1 | * | 9/2001 | Horibe ................. 290/40 A |
| 6,310,321 B1 | * | 10/2001 | Beeson et al. .......... 219/133 |

FOREIGN PATENT DOCUMENTS

| | | | |
|---|---|---|---|
| CH | 313664 | | 6/1956 |
| DE | 931791 C | * | 8/1955 |
| DE | 931 791 | | 8/1955 |
| FR | 2 401 736 | | 3/1979 |
| FR | 2 626 726 | | 8/1989 |
| GB | 1 601 589 | | 11/1981 |
| JP | 54-135938 | * | 10/1979 |
| JP | 57-101548 | * | 6/1982 |
| WO | 99/61193 | | 12/1999 |

* cited by examiner

*Primary Examiner*—Nestor Ramirez
*Assistant Examiner*—Pedro J. Cuevas
(74) *Attorney, Agent, or Firm*—Merchant & Gould P.C.

(57) ABSTRACT

The invention provides a method of providing a substantially stable supply of electrical energy under loading conditions. The method includes the steps of:

1. connecting a first generator connectably with a drive shaft of a drive means;
2. connecting a second generator to the drive shaft;
3. electrically connecting the first generator to the second generator such that, in use, substantially all the electrical energy generatable by the first generator energizes field coils of the second generator. The invention further provides an electrical power generation unit for carrying out the method. Yet further, the invention provides a portable welding unit including the electrical power generation unit of the invention.

18 Claims, 3 Drawing Sheets

ELECTRICAL POWER GENERATION UNIT FOR WELDING INCLUDING ELECTROMECHANICAL FEEDBACK MODE REGULATION

This is a Continuation-In-Part Application of PCT/ZW98/00010, filed on Jul. 17, 1998, having the title AN ELECTRICAL POWER GENERATION UNIT.

The Invention relates to an electrical power generation unit and to a portable welding unit.

BACKGROUND OF THE INVENTION

The inventor has found that in conventional electrical generation units of the type having a generator which must be excited or energised to produce an electrical energy output, as soon as a loading is applied to the output the electrical energy output drops. This problem is particularly acute in portable welding machines where the loading during welding is of such a nature that it can virtually shutdown the generator unless its drive means is substantially oversized.

SUMMARY OF THE INVENTION

According to a first aspect of the invention there is provided an electrical power generation unit including
   drive means for driving a drive shaft;
   a first electrical generator which is configured to be connected to and driven by the drive shaft in use;
   a second electrical generator which is larger than the first generator and is configured to be connected to and driven by the drive shaft; and
   the first generator being electrically connectable to the second generator such that, in use, substantially all the electrical energy generated by the first generator is used to excite or energise field coils of the second generator to permit electromechanical feedback regulation of output current from the second generator to smooth out fluctuations in the output energy delivered by the second generator under a loading condition; characterised in that the output voltage of the first generator is limited by the drive means to a voltage not exceeding the saturation voltage of the field coils of the second generator.

The second generator may be selected to be capable of supplying electrical power matching the power requirements of an electrical appliance to be energised.

The drive means may selected to be capable of supplying electrical power corresponding to the ratio of the maximum power characteristic of the second generator divided by the calibrated efficiency factor of the second generator.

A transmission ratio between the drive means and the second generator may be selected such that the output voltage of the second generator is limited by the drive means to a voltage approaching the saturation voltage of the second generator.

The first electrical generator may be a permanent magnet DC generator. The DC generator may be the DC motor of a vehicle cooling system fan, such as that provided on a Volkswagen (TM) utility vehicle.

Typically, the DC generator is mounted on a free end of the drive shaft. However, it may be mounted in any position and be driven by a belt and pulley system driven by the drive shaft.

The second electrical generator may be an AC alternator having field coils. Typically, the AC alternator is a standard 3-phase vehicle alternator.

The second generator may be connectable to the drive shaft by a belt and pulley system. The diameter of the pulley on the drive shaft may be selected so that, together with the operating characteristics of the primary and secondary generators, a desired output current at a specified voltage is provided from the secondary generator.

The electrical power generation unit may include a voltage regulator circuit connectable to a transformer on the output of the second generator for regulating the output voltage of the transformer at a predetermined voltage. Typically, the regulated output voltage is 220 V DC.

The electrical power generation unit may include a voltage rectifier circuit for rectifying the output voltage. The voltage rectifier may have a heat sink connectable in heat flow communication with the second generator for heat dissipation through a cooling system of the second generator. Typically the second generator cooling system includes a fan mounted to provide a flow of cooling air over the generator body.

The electrical power generation unit may include an output socket circuit connectable to permit electrical communication between any suitable tool and the power generation unit. Typically the output socket is a standard 3-pin type socket.

The electrical power generation unit may include a 3 phase rectifier and associated circuitry connectable to the power generation unit to form a welding unit having its own electrical power generation means. Typically, the alternator output is wired in delta configuration when used as a welding unit.

The power generation unit may include a battery charger circuit connectable to the power generation unit, for charging a battery connected to the battery charger or for boost starting an engine such as a vehicle engine when the battery usually employed for this purpose is inoperative.

The power generation unit may include a selector switch for selectively nominating between the circuits described above.

The electrical power generation unit may include a transportable mounting frame for facilitating the transportation of the unit. Typically, the mounting frame is a tubular cage having access openings for operator access to the power generation unit.

If required, the electrical power generation unit includes at least one additional secondary generator connectable to the drive shaft and the primary generator, in a similar fashion to that described above for the secondary generator, and co-operating with the other secondary generator in increasing the electrical energy output from the unit without the need for an increased size generator.

The drive means may be a fuel powered motor connectable to the drive shaft. The motor may be a petrol or diesel engine connectable to the drive shaft. The selection of petrol or diesel being an operational decision based on the surrounding circumstances such as fuel availability. In a specific embodiment the drive means may be an electric motor.

The invention extends to a transportable welding unit including a power generation unit as described above.

The invention further extends to a method of providing a substantially stable supply of electrical energy under loading conditions including the steps of:
   connecting a first generator to a drive shaft of a drive means;
   connecting a second generator to the drive shaft;
   electrically connecting the first generator to the second generator such that, in use, substantially all the electrical energy generatable by the first generator is used to excite or energise field coils of the second generator; characterised in that the output voltage of the first generator is limited by the drive means to a voltage not exceeding the saturation voltage of the field coils of the second generator.

The second generator may be selected to be capable of supplying electrical power matching the power requirements of an electrical appliance to be energised.

The drive means may be selected to be capable of supplying electrical power corresponding to the ratio of the maximum power characteristic of the second generator divided by the calibrated efficiency factor of the second generator.

A transmission ratio between the drive means and the second generator may be selected such that the output voltage of the second generator is limited by the drive means to a voltage approaching the saturation voltage of the second generator.

BRIEF DESCRIPTION OF THE DRAWINGS

The invention will now be described, by way of non-limiting example with reference to the accompanying diagrammatic drawings.

In the drawings.

MORE DETAILED DESCRIPTION

Figure 1:
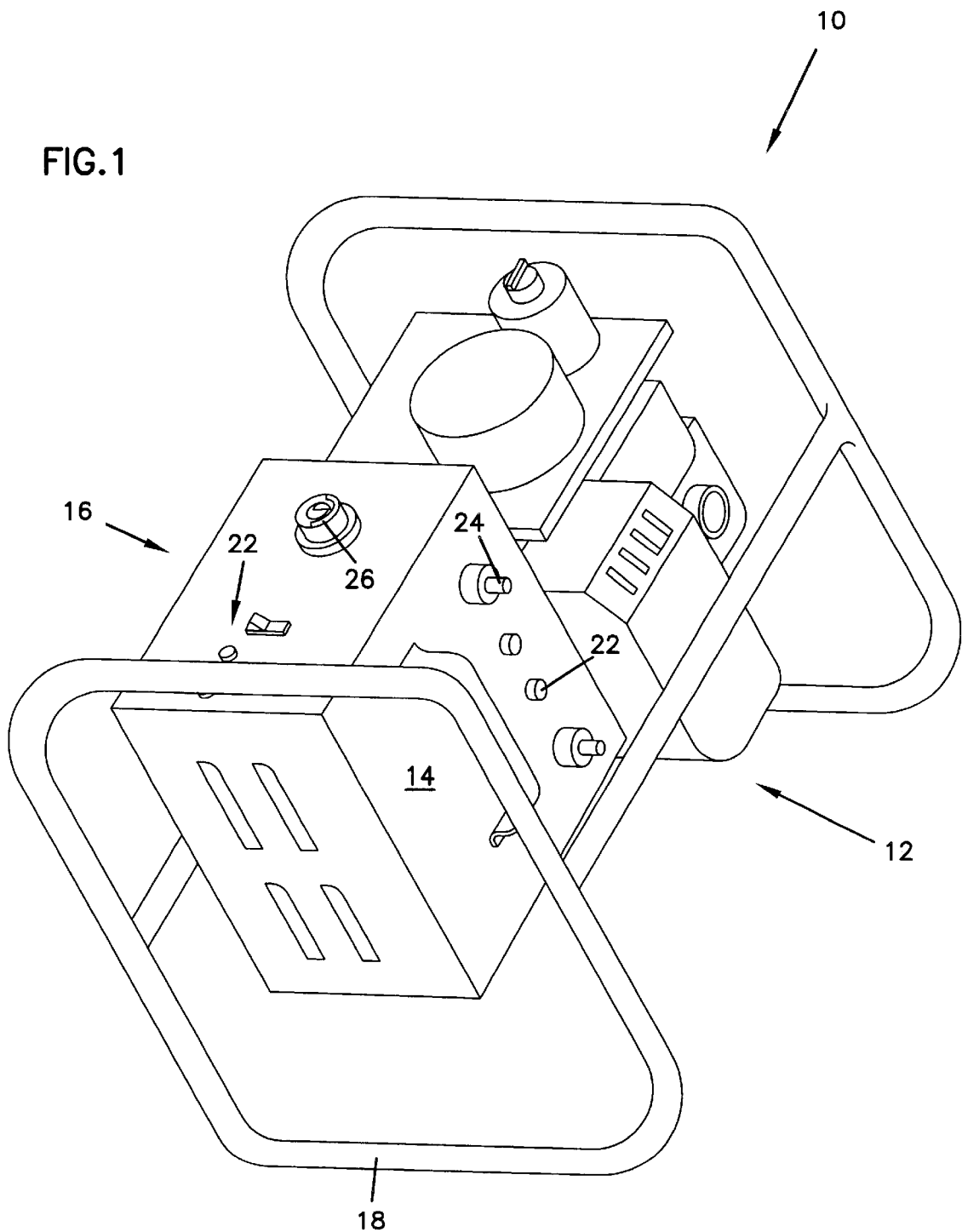
FIG. 1 shows, a pictorial three dimensional view, of a portable welding unit having an electrical power generation unit in accordance with the invention.

In FIG. 1, reference numeral 10 generally indicates a transportable welding unit, broadly in accordance with the invention. The welding unit 10 has a mechanical drive means in the form of a petrol engine 12, an electrical power generation unit 14 operativley connected to the engine 12 and a welding unit 16, all mounted in a transportable mounting frame in the form of a cage 18.

The power generation unit 14 has a 3-pin output socket 20 for connecting of power tools (not shown), battery charger and booster terminals 22, and welder output terminals 24. A selector switch 21 is provided for selecting between the 3-pin output socket 20, the battery charger 22 and the welder terminals 24.

Figure 2:
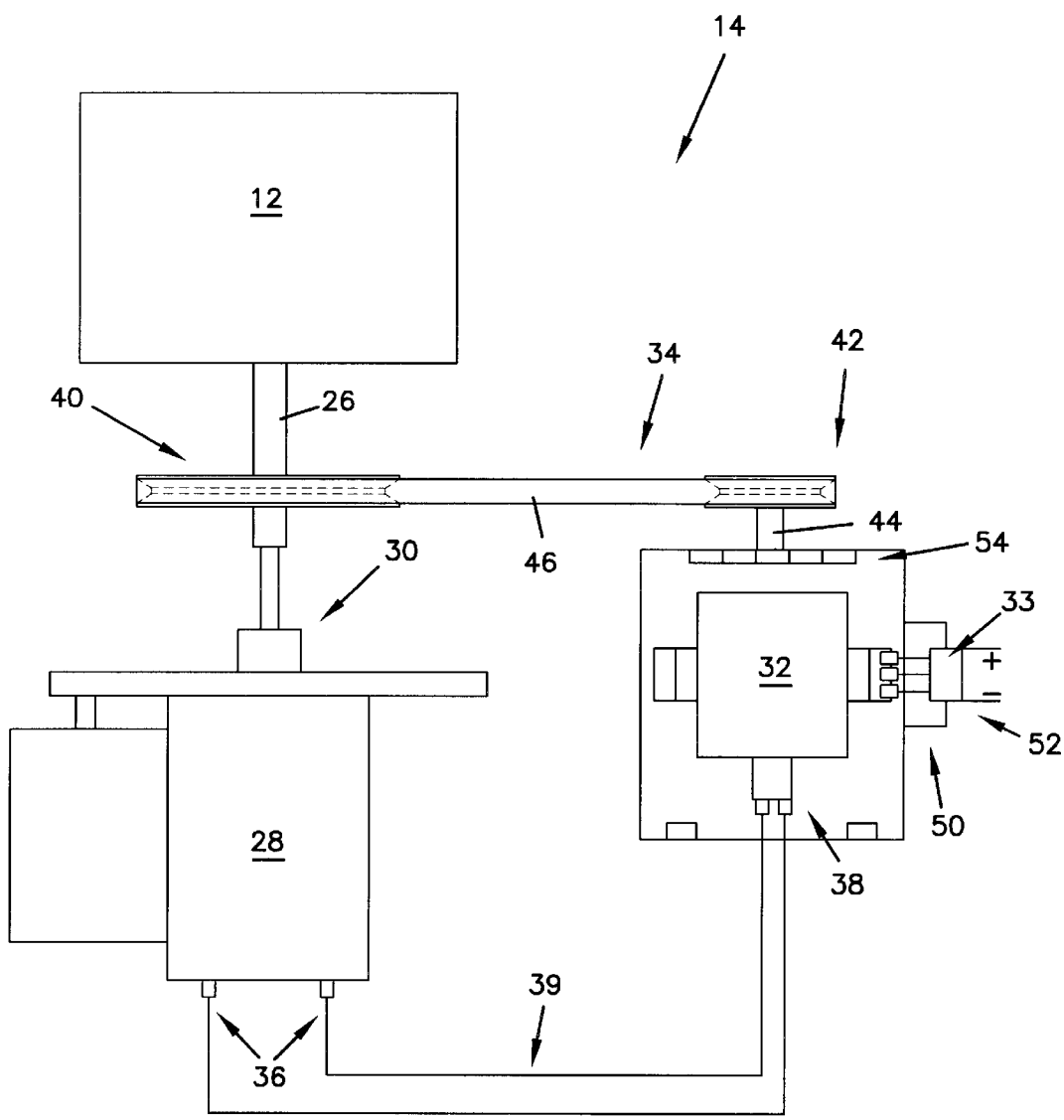
FIG. 2 shows a schematic representation of the electrical power generation unit.

In FIG. 2, reference numeral 14 indicates a power generation unit, broadly in accordance with the invention. The power generation unit 14 has a petrol engine 12, a drive shaft 26 driveable by the engine 12, a primary generator in the form of a permanent magnet DC generator 28 mounted on the free end 30 of the drive shaft 26, a secondary generator in the form of a standard vehicle 3-phase AC alternator 32 mounted remotely from the shaft 26 and driveable by the shaft 26 by means of a pulley system 34. The DC generator 28 output terminals 36 are connected to the AC alternator 32 field coil input terminals 38 by means of electrical cables 39, such that substantially all the electrical power generated by the generator 28 is used to excite or energise the alternator 32 field coils which in turn generates a 3-phase electrical output at output terminal 33 which is wired in a delta configuration.

The pulley system 34 comprises a first pulley wheel 40 mounted for rotation on the shaft 26, a second pulley wheel 42 mounted on the alternator 32 rotor shaft 44 and a v-belt 46 mounted over the pulley wheels 40, 42 for driving the alternator rotor shaft 44 from the drive shaft 26. The diameter of the pulleys 40, 42 is selected to provide a desired output current and voltage from the alternator 32. For example, a 135 mm first pulley 40 used in combination with a standard alternator pulley for the second pulley 42 and driven by a HONDA(TM) GX or GD range engine produces a maximum open circuit voltage of 70 V. With a 5.5 HP HONDA GX 160 the output current is in the range 60–100 amperes.

In use, the engine 12 is started by a user thereby causing the drive shaft 26 to rotate at the speed of the engine 12 crank shaft (not shown). As the drive shaft rotates so the rotor of the DC generator 28 is rotated thereby generating an output current at a potential difference of 12 V across the terminals 36 at an engine 12 speed of 3600 r.p.m. The current thus generated flows along the cables 39 to the field coil input terminals 38 of the alternator 32.

The rotor shaft 44 of the alternator 32 is driven by the pulley system 34 in parallel to the generator 28, the speed of rotation being fixed by the diameter of the first and second pulleys 40, 42 and the engine 12 revolutions. As a loading is applied to the output terminals 33 the alternator 32 initially exhibits a natural tendency to retard the rotation of the rotor shaft 44 and thus drive shaft 26 due to magnetisation of the field coils and rotor.

This retardation causes the engine 12 speed to drop and thus the speed of rotation of the shaft 26 which in turn leads to a reduced voltage across the generator terminals 36. The reduced voltage at terminals 36 leads to a reduced voltage at alternator field coil input terminals 38 thereby reducing the excitation of the field coils of the alternator 32 and thus the output from the alternator at output terminals 33. This reduced output in turn reduces the retardation on the drive shaft 26 permitting the engine speed to stabilise at an operating point at which the output from terminals 33, the excitation voltage at terminals 36 and 38 are in balance.

An electromechanical feedback loop for regulating the output from the alternator at terminals 33 is thus established and will respond in a similar fashion to any subsequent changes in loading conditions.

The electrical power generation unit includes a voltage rectifier arrangement 52 for rectifying the output voltage. The voltage rectifier arrangement 52 has a heat sink 50 connected in heat flow communication with the alternator 32 (secondary generator) for heat dissipation through a cooling system of the second generator which includes a fan 54 that provides a flow of cooling air over the body of the alternator 32.

Figure 3:
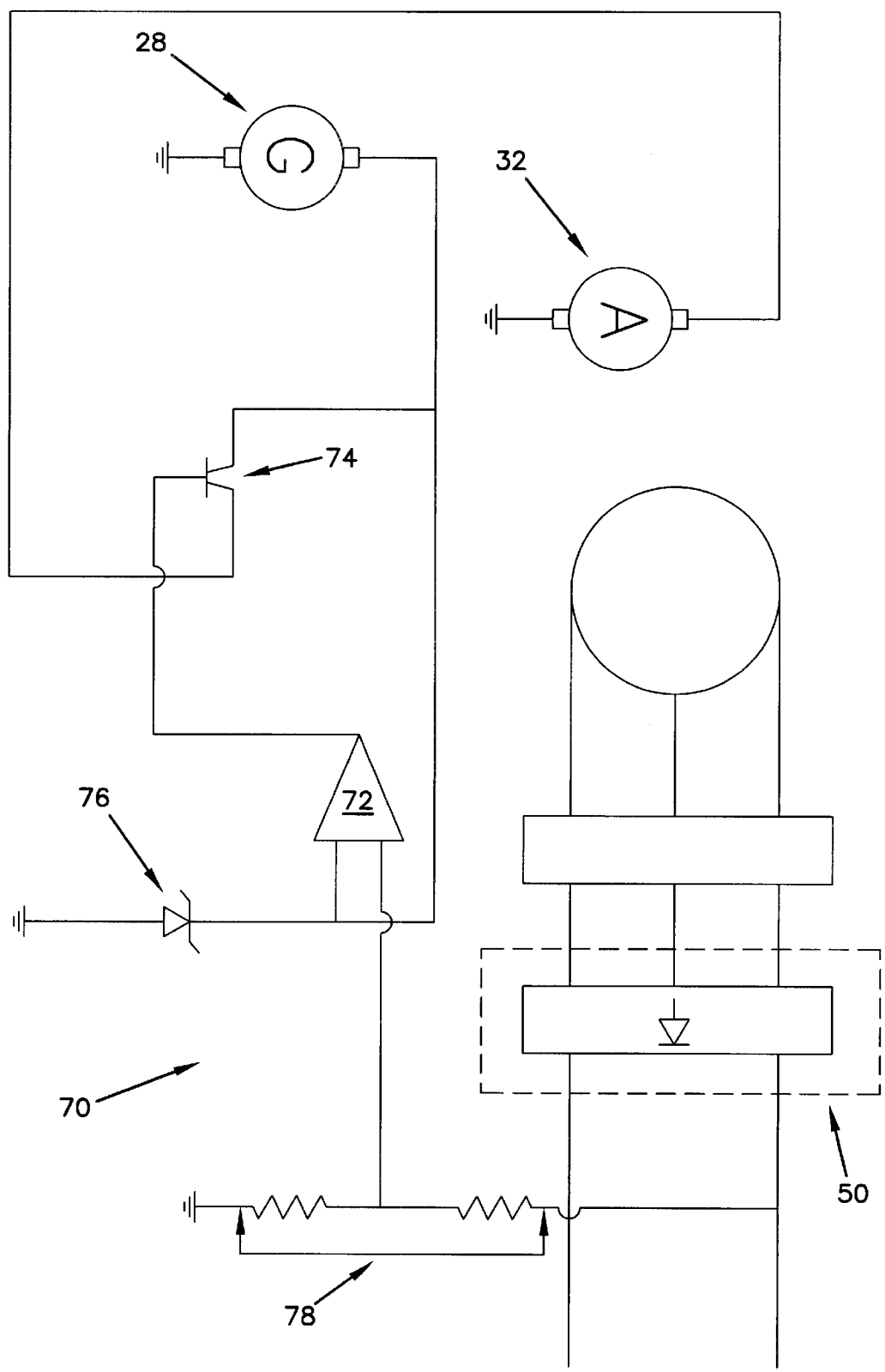
FIG. 3 shows the block diagram of the voltage regulation circuit.

In FIG. 3, reference numeral 70 generally indicates a block diagram of a voltage regulation circuit which is provided on the portable welding unit 10. The voltage regulation circuit 70 uses an operational amplifier 72, a transistor 74, a diode 76 and a voltage divider 78. The voltage regulation circuit 70 compares the output voltage from the alternator 32 with a pre selected reference voltage and by means of the operational amplifier 72 actuates the transistor 74 to vary the output voltage from the generator 28 to a level at which the output voltage from the alternator 32 is at the desired level of the reference voltage.

The Inventor believes that it is an advantage of the invention, as illustrated, that an electrical power generation unit having a true 100% duty cycle is provided without the need to substantially oversize the drive engine to provide for loading conditions. The Inventor believes that it is a further advantage of the invention, as illustrated, that a portable welding unit is provided, which has a 100% duty cycle, without being to heavy to carry, and in addition having accessories which permit a user to power power tools therefrom.

What is claimed is:

1. An electrical power generation unit comprising:
   drive means for driving a drive shaft at a speed which may vary depending upon the load applied to the drive shaft;
   a first electrical generator which is arranged and configured to be connected to and driven by the drive shaft to generate a first output electrical power that varies based on the speed of the drive shaft; and
   a second electrical generator arranged and configured to be connected to and driven by the drive shaft, the second electrical generator including field coils that are electrically connected to the first output electrical power wherein substantially all of the first output electrical power excites the field coils, the excitation of the field coils varies with the variation of the first output electrical power, and the second electrical generator is arranged and configured to generate a second output electrical power at an output thereof, the second output electrical power varying based upon the excitation of the field coils;
   whereby a change in the electrical load applied to the output of the second electrical generator varies the rotation speed of the drive shaft, which changes the first output electrical power, which changes the excitation of the field coils, and which changes the second output electrical power.

2. An electrical power generation unit as claimed in claim 1 wherein the second generator is selected to be capable of supplying electrical power matching the power requirements of an electrical appliance to be energised.

3. An electrical power generation unit as claimed in claim 1 wherein the drive means is selected to be capable of supplying electrical power corresponding to the ratio of the maximum power characteristic of the second generator divided by the calibrated efficiency factor of the second generator.

4. An electrical power generation unit as claimed in claim 1 wherein a transmission ratio between the drive means and the second generator is selected such that the output voltage of the second generator is limited by the drive means to a voltage approaching the saturation voltage of the second generator.

5. An electrical power generation unit as claimed in claim 1, in which the first electrical generator is a permanent magnet DC generator which is mounted on a free end of the drive shaft.

6. An electrical power generation unit as claimed in claim 5, in which the DC generator is the DC motor of a vehicle cooling system fan.

7. A power generation unit as claimed in claim 1, in which the second electrical generator is an AC alternator having field coils.

8. A power generation unit as claimed in claim 7, in which the AC alternator is a standard 3-phase vehicle alternator.

9. An electrical power generation unit as claimed in claim 1, in which the second generator is connectable to the drive shaft by a belt and pulley system in which the diameter of the pulley on the drive shaft is selected to provide a desired output current at a specified voltage from the second generator.

10. An electrical power generation unit as claimed in claim 1, including a voltage regulator circuit connectable to the second generator for regulating the output voltage at a predetermined voltage and a voltage rectifier circuit for rectifying the output voltage.

11. A power generation unit as claimed in claim 10, in which the voltage rectifier has a heat sink connectable in heat flow communication with the second generator for heat dissipation through a cooling system of the second generator.

12. An electrical energy power generation unit as claimed in claim 1, in which an output socket circuit is connectable thereto to permit electrical communication between any suitable power tool and the power generation unit.

13. An electrical power generation unit as claimed in claim 1, which includes a three phase rectifier.

14. A power generation unit as claimed in claim 1, which includes a battery charger circuit for charging a battery and a selector switch.

15. An electrical power generation unit as claimed in claim 1, including a transportable mounting frame for facilitating the transportation of the unit.

16. An electrical power generation unit as claimed in claim 1, including at least one additional secondary generator connectable to the drive shaft and the primary generator for increasing the electrical energy output delivered by the unit.

17. The electrical power generation unit of claim 1, wherein the second electrical generator is configured to be indirectly driven by the drive shaft.

18. An electrical power generator, of the type used for a welding device, the generator comprising:
   a) a prime mover having an output shaft;
   b) an electrical alternator being cooperatively connected to the output shaft, the alternator having a field coil, and the alternator arranged and configured to produce an electrical output for use by the welding device, wherein loads placed on the alternator by the welding device are transferred to the drive shaft and may slow the rotational speed of the output shaft;
   c) an electrical generator cooperatively connected to the output shaft, the generator arranged and configured to produce an output electrical voltage applied to the field coil which varies with changes in the rotational speed of the output shaft, wherein electromechanical feedback regulation occurs by lowering the output electrical voltage and the resulting lower electrical output by the alternator decreases the load on the output shaft.

* * * * *